Patented Feb. 24, 1925.

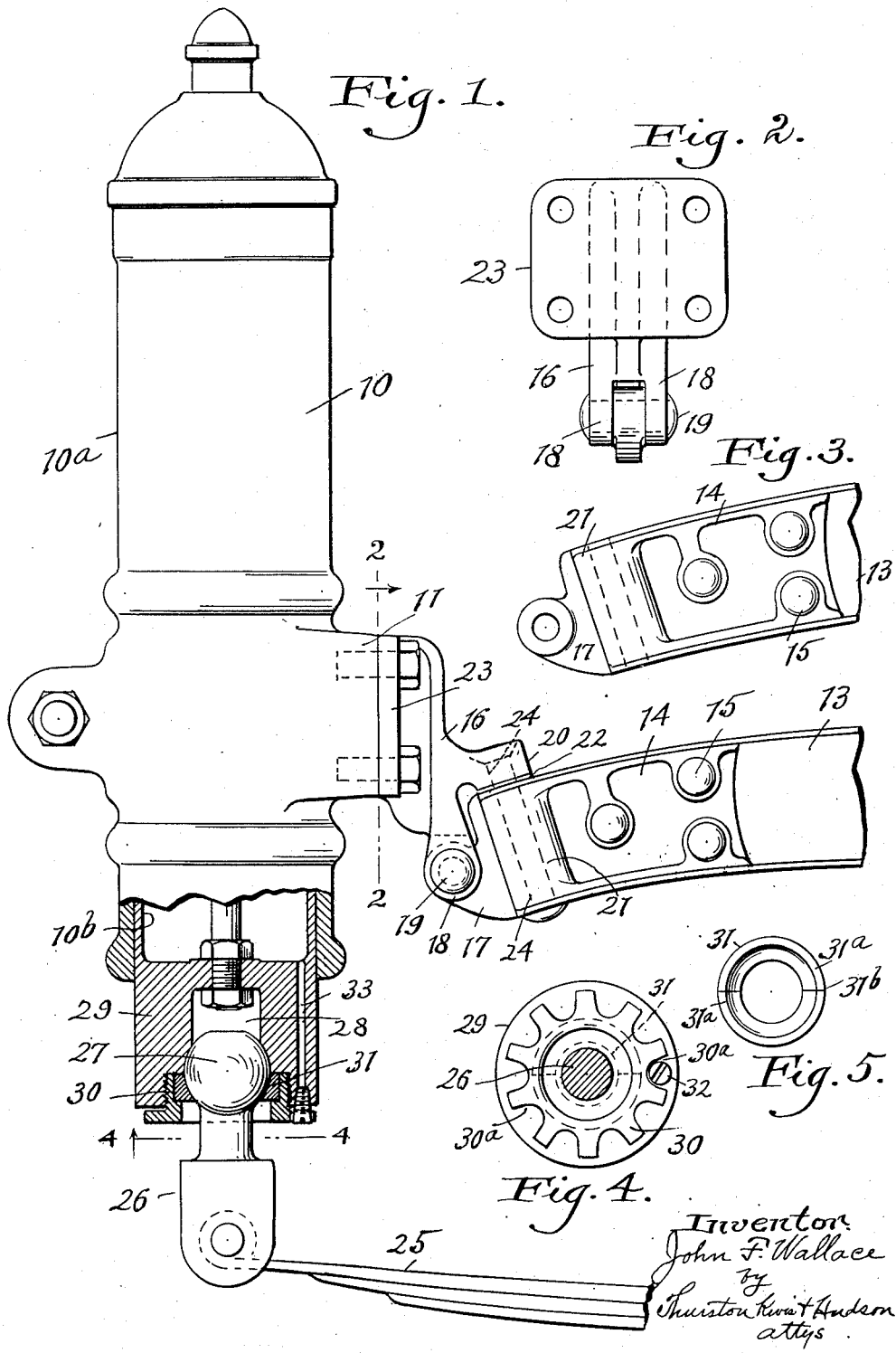

1,527,764

UNITED STATES PATENT OFFICE.

JOHN F. WALLACE, OF CLEVELAND, OHIO, ASSIGNOR TO THE CLEVELAND PNEUMATIC TOOL COMPANY, OF CLEVELAND, OHIO, A CORPORATION OF OHIO.

AIR SPRING.

Application filed December 27, 1921. Serial No. 524,862.

*To all whom it may concern:*

Be it known that I, JOHN F. WALLACE, a citizen of the United States, residing at Cleveland, in the county of Cuyahoga and State of Ohio, have invented a certain new and useful Improvement in Air Springs (Case A), of which the following is a full, clear, and exact description.

The present invention relates to improvements in air springs or shock absorbers for vehicles, in connection with the main springs thereof, and it relates particularly to the mounting of the air springs on the vehicle, including the attachment thereof to the chassis frame and the connection with the leaf spring.

One of the objects is to provide an improved form of bracket between the air spring and the chassis frame so as to provide a bracket having a construction such that the air springs can be very readily and properly mounted on the chassis, and having by reason of its construction a range of adjustability which reduces to a minimum the number of different brackets required to mount the air springs on cars of different makes.

Another object of the invention is to provide the connection between the air spring and leaf spring which minimizes liability of breakage or disconnection in the shackle or connecting device between the air spring and leaf spring, and provides for adjustability to compensate for wear.

The invention may be briefly summarized as consisting in certain novel details of construction, and combinations and arrangements of parts which will be described in the specification and pointed out in the appended claims.

In the accompanying sheets of drawings wherein I have shown one embodiment of the invention which operates with high efficiency, Fig. 1 is a side view of an air spring attached to the chassis frame and leaf spring, a portion of the frame and spring only being shown, and the lower part of the air spring being in section; Fig. 2 is a view looking toward the face of the bracket and viewed along the line 2—2 of Fig. 1; Fig. 3 is a side view of that part of the bracket which is attached to the chassis frame; Fig. 4 is a sectional view substantially along the line 4—4 of Fig. 1, looking upward; and Fig. 5 is a detail view of a spherical split seat in which the ball of the so-called member engages.

Referring now to the drawings, 10 represents as a whole, the air spring, the details of which are not material to the present invention. Preferably this spring is of the type composed of a pair of upper sleeves including an outer one designated $10^a$, and an inner sleeve telescopically arranged with respect to the upper sleeve, and a portion of which is shown at $10^b$, this sleeve being designed to slide in the well-known manner between the two upper sleeves. A spring of this type is designed to be provided with one or more cushioning chambers adapted to be supplied with air and oil, and the operation of which is well-known.

Integral with, or attached to the sleeve $10^a$, which constitutes an outer housing is a seat portion 11, designed to be attached to the chassis frame, a portion of which is shown at 13. In attaching an air spring of this kind to the chassis frame, a bracket is utilized, but inasmuch as it is important that the spring be in true vertical position, it is often a difficult matter to properly mount the spring, and in some instances it is necessary that the bracket be re-shaped to bring that portion of the bracket which engages the housing of the air spring to proper position. Likewise, it is usually the case that a large variety of castings are required to be kept on hand.

In accordance with the present invention I employ a two-part bracket including a part 14, adapted to fit into the channel of the chassis frame and to be secured therein by rivets or the like 15, and a part 16, which is designed to be connected to the part 14 and to be attached to the housing of the air spring. The parts 14 and 16 of the bracket have the equivalent of a hinge connection formed in this instance by a forwardly projecting ear 17 on the part 14, and a pair of ears 18 on the bottom portion of the part 16 of the bracket, and between which the ear 17 projects and is secured by a rivet 19 or equivalent means. Additionally the part 16 has a rearwardly projecting lug 20 which is in line with a front boss 21 on the part 14 of the bracket when the parts 14 and 16 occupy their proper fixed relationship.

This construction enables the positioning of the parts 16 with reference to the part 14, before these parts are definitely fastened together, and if necessary, a shim 22 may be provided beneath the lug 20 to bring the pad 23 of the part 16 into proper position with respect to the portion 11 of the housing of the air spring. When the parts occupy the proper relationship, the two parts 14 and 16 of the bracket are rigidly secured together by a rivet or equivalent means 24 which passes through the lug, through the shim 22, and if the same is employed, through both flanges on the chassis frame member 13, and through the boss 21 of the part 14 of the bracket. With this construction a very rigid mounting can be obtained without loss of time, and with the air spring perfectly positioned with reference to the chassis frame.

Furthermore, the construction is such that the same bracket can be used both as a right and a left, i. e. for both sides of the chassis frame, and obviously the same size or design of bracket can be used for all cars, the chassis frame members 13 of which have the same shape or design, and are therefore adapted to receive the part 14 of the bracket.

Another improvement, as before stated, resides in the connection between the leaf spring, which is indicated at 25, and the bottom of the air spring. In this instance the leaf spring is connected to the air spring by a shackle 26 having a bifurcated lower portion to which the end of the leaf spring is pinned. Likewise, this shackle has at the top a ball 27 which engages a spherically formed seat, formed in a recess 28 in the lower head or bottom 29 of the lower sleeve 10$^b$.

To provide a good connection between the shackle and the bottom of the air spring, and at the same time to provide a connection which admits of adjustability for wear, the lower part of the recess 28 is enlarged and threaded, and receives an adjustable bushing 30 having a shoulder on which is supported a split bearing 31 for the spherical seat held up against the ball by the bushing, this bearing being formed of two parts 31$^a$, 31$^a$, split at diametrically opposite points indicated at 31$^b$ in Fig. 5.

The bottom of the bushing 30 has a laterally projecting flange provided with radial notches indicated at 30$^a$, and adapted to receive a suitable holding device 32 which may be, and in this instance is shown as the outer portion of a plug normally closing the bottom of a duct 33, through which oil is adapted to be admitted to the air spring.

With this construction the parts are assembled as shown in Fig. 1, and the bushing is adjusted so as to obtain the necessary close fit between the ball 27 and the spherically shaped seats which it is designed to engage, after which the plug or pin 32 is inserted to hold the bushing against movement. This provides an exceedingly effective holding means for the ball of the shackle, and one which is not liable to be broken, irrespective of the severe wedging to which the vehicle may be subjected. However, when wear occurs, the play can be taken up by removing the plug or pin 32, turning the bushing 30 so as to move it inward slightly, after which the plug will be restored to hold the bushing in its adjusted position.

Having described my invention, I claim:

1. In combination with a telescopic shock absorbing device adapted to be employed in connection with a leaf spring of a vehicle, a mounting by which the device is adapted to be attached to the chassis of a vehicle and comprising a part adapted to be secured to the chassis and a part adapted to be secured to the shock absorbing device, said parts having portions thereof connected together in such manner as to permit adjustment of said parts one relative to the other and other portions adapted to be rigidly secured together.

2. Means for securing a shock absorbing device to a vehicle comprising a two-part bracket composed of a part adapted to be secured to the frame of a vehicle and a part adapted to be secured to the shock absorbing device, said parts having portions so connected as to permit relative adjustment of the parts to properly position the shock absorbing device, and having overlapping portions adapted to be rigidly fastened together.

3. In combination with a vehicle having a chassis frame and a leaf spring, an auxiliary shock absorber adapted to be connected between the leaf spring and chassis frame, a bracket for attaching the shock absorber to the chassis frame comprising two parts, one adapted to be connected to the chassis frame and the other to the shock absorbing device, said parts having portions connected together in the form of a hinge, and having other portions adapted to be connected together to prevent relative movement between the parts.

4. In combination with a vehicle having a chassis frame and a leaf spring, an auxiliary shock absorbing device adapted to be connected between the end of the leaf spring and the chassis frame, a mounting for said device comprising a part adapted to be fitted and secured to the chassis frame, a part adapted to be secured to said device, both parts having portions connected together by means forming a horizontal pivot, and said second mentioned part having a lug extending over the end of the chassis frame and rigidly secured with reference thereto.

5. An auxiliary shock absorbing device composed of telescoping members, one adapted to be secured to the chassis frame of a vehicle and the other to a leaf spring thereof, the lower part of said device having a recess with a spherical seat, a shackle having a ball engaging said seat, and means for holding the ball in engagement with the seat, comprising a bushing adjustably mounted in the lower part of said car spring and having a split bearing member with a spherical seat engaging the ball.

In testimony whereof, I hereunto affix my signature.

JOHN F. WALLACE.